Dec. 27, 1927.
E. M. COLE
1,654,414
GUANO DISTRIBUTOR
Filed Aug. 30, 1926
2 Sheets-Sheet 1
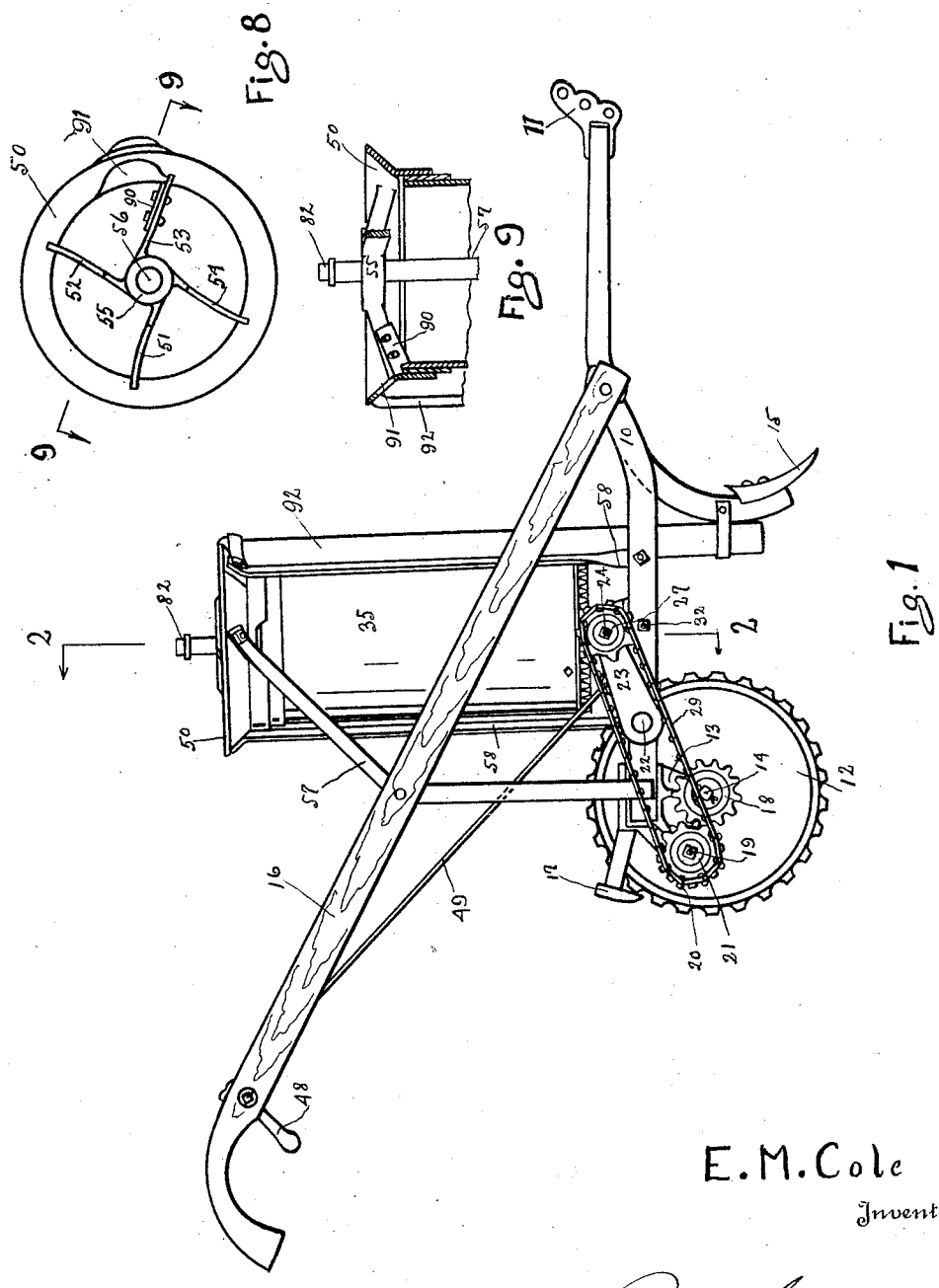
E. M. Cole
Inventor
By [signature]
Attorney Dec. 27, 1927. 1,654,414
E. M. COLE
GUANO DISTRIBUTOR
Filed Aug. 30, 1926 2 Sheets-Sheet 2
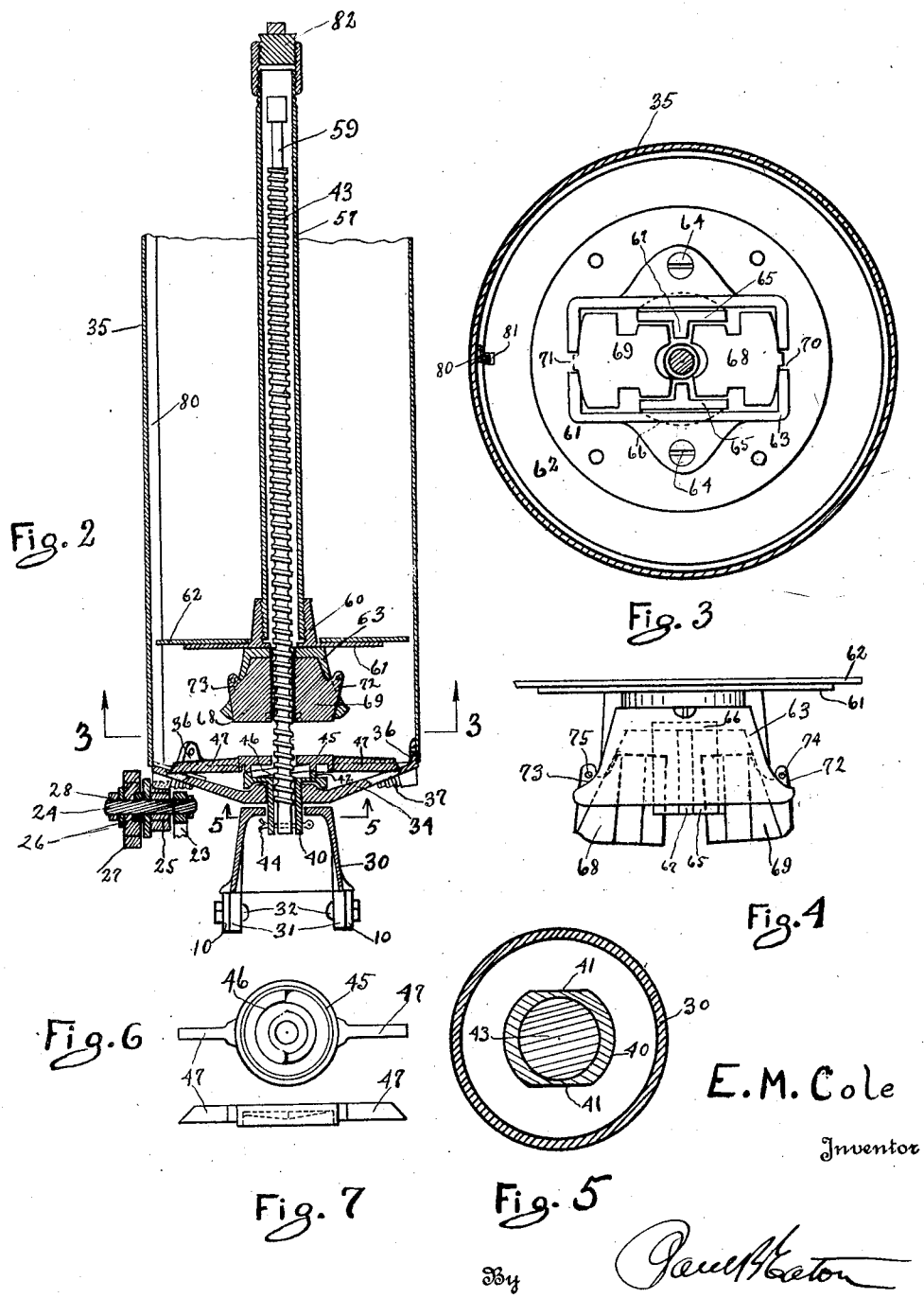
E. M. Cole
Inventor Patented Dec. 27, 1927.

1,654,414

UNITED STATES PATENT OFFICE.

EUGENE M. COLE, OF CHARLOTTE, NORTH CAROLINA.

GUANO DISTRIBUTOR.

Application filed August 30, 1926. Serial No. 132,497.

My invention relates to improvements in guano distributors, and more especially to a type of guano distributor which has a rotary hopper.

An object of my invention is to provide a guano distributor which will at all times while the distributor is in operation deliver a certain measured quantity of guano, regardless of the amount of moisture contained in the guano, and also regardless of the fineness of the guano.

Another object of my invention is to provide a guano distributor which will begin delivering a definite measured amount of guano immediately upon the starting of the distributor, and will maintain this measured ratio during the progress of the machine.

Another object of my invention is to provide a guano distributor having a revolving hopper with a bottom to said hopper which revolves with the hopper and is forced upwardly in the hopper as the machine progresses, together with improved means for releasing the hopper bottom from the raising means and allowing the said bottom to assume its bottommost position and accurately engage the raising means while in its lowermost position.

Referring to the drawings:

Figure 1 is a side elevation of my guano distributor;

Figure 2 is a cross-sectional view of the hopper and associated parts taken along the line 2—2 in Figure 1 and looking in the direction indicated by the arrows;

Figure 3 is a cross-sectional view of the hopper taken along the line 3—3 in Figure 2, looking upwardly as indicated by the arrows;

Figure 4 is a side elevation of my hopper's vertically movable bottom and associated parts;

Figure 5 is a cross-sectional view taken along the line 5—5 in Figure 2;

Figure 6 is a bottom plan view of a cam member used in connection with the bottom raising means;

Figure 7 is a side elevation of the structure shown in Figure 6;

Figure 8 is a plan view of the top of the hopper;

Figure 9 is a cross-sectional view of the top of the hopper taken along the line 9—9 in Figure 8.

My guano distributor has the main frame members 10, a draft means 11 and a ground wheel 12 rotatably mounted between the rear ends of the frame members 10. Suitable castings, such as those indicated at 13, are secured to the frame members 10 and the ground wheel 12 is fixedly mounted on the rotatable shaft 14 in the said castings. My guano distributor has the conventional furrow opener 15, the handles 16 and a scraper 17 for the ground wheel 12. Mounted on one end of the shaft 14 is a suitable cog wheel 18 and to the rear of this cog wheel 18 there is secured the bolt 19, and on this bolt 19 there is rotatably secured the cog wheel 20 which has a squared portion on its side farthest from the ground wheel, which squared portion is adapted to receive a sprocket wheel 21. A sprocket chain 29 fits over the wheels 21 and 27.

Pivotally secured to one of the frame members 10 by means of the bolt 22 is the arm 23, which has a bolt 24 in its free end on which is rotatably mounted a cog wheel 25 which has an outwardly projecting squared portion 26, which is adapted to receive the sprocket wheel 27, and a nut 28 is placed on the end of the bolt 24 to hold the sprocket wheel 27 and the cog wheel 25 in proper position.

By means of the lever 48 and the rod 49 the machine can be thrown into or out of gear, as an upward pull on the lever swings the arm 23 and associated parts downward out of engagement with the gears on the hopper 35.

Secured to the frame members 10 is the inverted cup-shaped member 30 which has downwardly projecting lugs 31 which have holes therethrough which serve to receive the bolts 32 for securing the member to the frame 10. This cup-member 30 has a flat upper surface and a hole in the center of this flat upper surface upon which the central portion of the member 34 is adapted to rest and rotate. This member 34 has an upturned flange 36 to which is secured the hopper 35, and on its lower outer portion and extending entirely around the same are the cogs 37, which are adapted to be engaged by the cog wheel 25, as previously explained.

Fitting through the hole in the center of the hopper member 34 is the cam member 40 which has flattened portions 41 which fit into a correspondingly shaped hole in the top of the member 30 in such a manner as to prevent relative rotative movement between the cam member 40 and the member 30. The upper face of this member 40 has a cam 42 thereon, and there is a hole vertically through the member 40 in which the screw 43 fits and is secured by the cotter pin 44. Loosely fitting around this screw 43 is the member 45 which also has cams 46 on its lower side having the same radius as the cams 42, and adapted to work therewith. The member 45 has arms 47 which project outwardly and fit into holes in the member 34, thereby rotating with this member.

At the top of the hopper 35 there is the outwardly flaring ring 50 which encircles the top of the hopper 35. This ring has webs 51, 52, 53 and 54 running from the ring to the center thereof and forming the hub 55 which has a hole 56 therein for the reception of the casing 57 of the screw 43. The ring 50 is secured to the handle members 16 by means of the braces 57 and is secured to the frame members 10 by the braces 58, thus making this ring rigid with the frame.

The screw 43 has threads thereon all the way from the point where it emerges from the cam member 40 to a point 59 near its upper end, where it becomes smaller and has no threads thereon, the purpose of which is to cause the movable bottom member 62 to cease its upward movement when it has reached this point.

Encasing the screw member 43 is the pipe member 57 which is threaded exteriorly at its lower end and threadably engages the member 60 which has a hole in its center through which the screw 43 passes. This member 60 flares outwardly and forms the circular plate 61 to which is secured the movable bottom member 62. Just below the plate 61 and secured thereto is the rectangular shell member 63, which is secured by means of the bolts or rivets 64. This member 63 has the members 65 fitted on its inner faces, which are loosely held in position by the lugs 66 projecting outwardly into a slot formed between the upper face of the member 63 and the plate 61. These members 65 have vertical guides 67 which prevent the members 68 and 69 from gripping the screw too tightly when the hopper is filled with guano. The end walls of the member 63 have slots 70 and 71 vertically disposed therein which serve as guides for the projections 72 and 73 on the members 68 and 69. These projections have holes therein for the reception of the pins 74 and 75, which prevent the members 68 and 69 from falling out of the member 63 when the same is manually raised. The oppositely disposed wall portions of the members 69 and 68 are concave and are threaded to engage the screw 43. Their end wall portions are slanted inward toward the top to correspond with the inwardly and upwardly slanting end wall portions of the member 63. The side wall portions of the members 68 and 69 are vertically disposed.

The inside wall portion of the hopper 35 has a vertical guide 80 projecting into the hopper which is adapted to engage a notch 81 in the periphery of the movable bottom member 62 and thus prevent the same from rotating except in association with the hopper 35.

The shell which encases the screw 43, and which is designated by the numeral 57 has a plug 82 to close the upper end of the same. In operation it is intended that grease be placed in this shell for the lubrication of the screw 43.

The bottom member 34 has holes therein through which any waste guano which passes by the movable bottom member may fall onto the ground and thus be prevented from coming in contact with the screw 43 and the cams 42 and 46.

The spider leg 53 has an adjustable knife 90 thereon which is adapted to scrape guano off into the spout 92 through hole 91 as it is pushed upwardly in the hopper by the upward movement of the vertically movable bottom 62, driven by the screw 43. After passing into the spout the guano will fall into the furrow made by the plow 15. The lower edges of the spider legs 54, 51 and 52 are each one-quarter of the height of one of the threads on the screw 43 higher than the preceding spider leg, so that when the hopper is filled with guano up around the spider legs there will be the proper amount of guano delivered to the knife 90 while there is a surplus of guano between the spider legs. This will insure that guano will be fed from the beginning of operation of the machine, even though the guano settles on account of the machine while in operation. There is usually more or less settling of the mass of guano in the hopper due to vibration. The means for holding a surplus of guano is provided to compensate for this settling, and thus insures that the knife 90 will at all times make a cut from the top of the mass of guano the full width of one thread.

The method of operation of my guano distributor is as follows:

When it is desired to lower the bottom 62 to its lowest position, the operator seizes the pipe 57 and raises the same upwardly. The weight being thus relieved from the members 68 and 69, they fall downwardly and outwardly and become dis-engaged from the screw 43, and assume the position shown in Figure 4. The bottom 62 and associated parts can then be pushed downwardly until the lower faces of the members 68 and 69 engage the upper face of the cam member 45, and the weight of the pipe 57, bottom 62 and associated parts will cause the members 68 and 69 to be forced inwardly due to the pressure against their inwardly and upwardly sloping outer sides, and will cause the threads on the members 68 and 69 to engage the threads on the screw 43.

It will be noted that an important feature of my invention lies in the fact that for each round of the hopper 35 the cam member 45 will raise one round on the screw 43 and then drop back to initial position, being actuated by the cams on the cam members 45 and 40. This means that at whatever point in their rotation that the bottom 62 and associated parts are stopped, they may be released from the screw 43 and allowed to fall to the lowest position against the cam member 45 and threaded members 68 and 69 will engage the threads on the screw 43 in exactly the same relation at which they engaged the screw when they were released, thus ensuring that the threads will never be injured as the case would be were these cam members not present in the mechanism.

As the guano distributor is pulled over the field the ground wheel 12 and cog wheels 18 and 20, sprocket wheels 21 and 27, sprocket chain 29 and cog wheel 25 will cause the hopper 35 to rotate in a clockwise direction when viewed by the operator standing between the handles and looking forward, but the rim 50, the cup-shaped member 30, the screw 43 and the cam member 40 will not rotate, but the vertically movable bottom 62 and associated parts will rotate with the hopper due to the fact that a notch in the periphery of the bottom member 62 engages the guide 80 on the wall portion of the hopper 35. For the first round that the hopper 35 rotates the cam member 45 will rise with the parts 68 and 69 and will be flush against their lower faces, but on the completion of the first round of rotation of the hopper the cam member 45 will fall back to initial position and will repeat this operation for each round of rotation of the hopper 35. The bottom member 62 will continue to rise in the hopper 35 as the machine progresses across the field and will push the guano upwardly in the hopper and the knife 90 will force the guano off through the hole 91 into the spout 92 through which guano will fall into the furrow made by the plow 15.

My invention having been fully described, what I desire to secure and protect by Letters Patent of the United States of America is as follows:

1. In a guano distributor, a frame, a rotatable hopper mounted in the frame, a screw vertically mounted in the hopper and fixedly secured in the frame, a circular plate, means associated with the circular plate for threadably engaging the screw and adapted to rotate with the hopper and to be raised upwardly in the hopper to force the guano out of the top of the hopper and into a spout at the upper end of the hopper, said screw engaging means being adapted to be released from the screw and to automatically engage the screw when lowered to the bottom of the hopper.

2. A guano distributor having a rotatable hopper, a delivery spout leading from the upper portion of the hopper for distributing the guano, a movable hopper bottom adapted to be raised by the progress of the distributor, a blade member at the top of the hopper for delivering the guano from the top of the hopper to the spout, means associated with the movable bottom for engaging the raising means, said means being adapted to be dis-engaged from the raising means by a pull and to allow the movable bottom to descend to the lower portion of the hopper and to automatically and properly engage the raising means in said lowered position.

3. In a guano distributor, the combination of a rotatable hopper mounted in a frame work, a vertically movable bottom for said hopper, driving means for raising said bottom, said bottom being adapted to assume its lowest position when raised by means other than the driving means.

4. In a guano distributor, a rotatable hopper having a bottom adapted to be moved vertically by the progress of the distributor, and being adapted to be lowered after an upward pull is exerted thereon.

5. In a guano distributor, a rotatable hopper, a base secured to the framework of the distributor on which said hopper is adapted to rest and rotate, a vertically movable bottom for said hopper, a screw member fixedly secured to the base, means associated with said movable bottom for normally engaging the screw, a vertical guideway on the inside wall of the hopper, a notch in the movable bottom for engaging the guideway and causing the movable bottom to rotate with the hopper, the screw engaging means being adapted to automatically dis-engage the screw when pulled upward.

6. In a guano distributor, the combination of a rotatable hopper, a vertically movable bottom for said hopper, screw means associated with the frame for raising the bottom and forcing the guano out of the top of the hopper, a delivery spout connected to the top of the hopper, a spider member spanning the top of the hopper, a cutting member mounted on one of the legs of the spider member, the legs of the spider member being positioned successively and progressively at higher points above the cutting member.

7. In a guano distributor, a rotary hopper, a vertically movable bottom for said hopper, means for gradually raising the bottom, said means being adapted to become inoperative after the bottom has been manually raised upward.

8. In a guano distributor, a rotary hopper, a screw fixedly mounted on the distributor, and extending vertically upward inside the hopper, a vertically movable bottom normally and threadably engaging the screw, a cam member fixedly secured to the base of the screw, a second cam member loosely fitting around the base of the screw and adapted to rotate with the hopper and to be raised with the movable bottom for the first revolution of the hopper, and to drop back to its initial position at the end of each complete revolution.

9. In a distributor, a frame, a rotatable hopper, a vertically movable bottom for said hopper, a screw fixed on the frame for raising said bottom, means associated with the bottom for engaging the screw, said means comprising a rectangular hollow shell, triangular members secured in the shell, slots in the end wall portions of the shell, projections on the triangular members extending through the slots, a pin piercing the projections outside the shell to hold the said triangular members in the shell, threads on the adjoining faces of the triangular members adapted to normally engage the screw, said triangular members being adapted to dis-engage themselves from the screw when the bottom is manually raised, and to engage the screw when the bottom is in its lowest position in the hopper.

10. In a guano distributor, a receptacle mounted for rotation, a bottom member adapted to slide within and to rotate with the receptacle, a feed screw mounted in the frame, threaded and releasable means associated with the movable bottom for engaging the feed screw while the hopper is being rotated, thereby raising the bottom.

11. In a distributor for guano and other substances, a receptacle mounted for rotation in a framework, a bottom member adapted to slide within and to rotate with the receptacle, a feed screw secured to the framework and arranged vertically within the receptacle, releasable means associated with the bottom for engaging the screw to raise the bottom vertically during the rotation of the receptacle, a delivery spout positioned near the upper end of the receptacle, and a plurality of scraper blades in the upper end of the receptacle adapted to direct the guano into the spout as the same is forced upwardly in the receptacle.

12. In a distributor for guano and the like, a frame, a rotary hopper mounted on the frame, a vertically movable bottom arranged within said hopper, a feed screw fixedly secured to the frame and extending into the hopper, a vertical guideway on the interior of the hopper adapted to fit into a notch in the periphery of the bottom, means for imparting a rotary movement to said hopper, means associated with the movable bottom for threadably engaging the screw, said means being adapted to be dis-engaged from the screw when the bottom member is raised manually.

In testimony whereof I have affixed my signature.

EUGENE M. COLE.